(12) United States Patent
Natroshvili et al.

(10) Patent No.: US 11,077,756 B2
(45) Date of Patent: Aug. 3, 2021

(54) AREA OCCUPANCY DETERMINING DEVICE

(71) Applicant: Intel Corporation, Santa Clara, CA (US)

(72) Inventors: Koba Natroshvili, Waldbronn (DE); Kay-Ulrich Scholl, Malsch (DE)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 15/821,784

(22) Filed: Nov. 23, 2017

(65) Prior Publication Data
US 2019/0047439 A1    Feb. 14, 2019

(51) Int. Cl.
*B60L 15/00*    (2006.01)
*G06T 7/70*    (2017.01)
*G06K 9/00*    (2006.01)

(52) U.S. Cl.
CPC .......... *B60L 15/00* (2013.01); *G06K 9/00805* (2013.01); *G06T 7/70* (2017.01); *B60L 2240/62* (2013.01); *G06T 2207/30261* (2013.01)

(58) Field of Classification Search
None
See application file for complete search history.

(56) References Cited

U.S. PATENT DOCUMENTS 10,303,178 B1 * 5/2019 Gutmann .............. B60W 30/08
10,491,885 B1 * 11/2019 Hicks ...................... G01S 17/42

2006/0293856 A1 * 12/2006 Foessel ................. B60W 30/09
                                                                  701/301
2007/0005306 A1 *  1/2007 Foessel ................. G01S 13/723
                                                                  702/189
2010/0305858 A1 * 12/2010 Richardson ........ G06K 9/00785
                                                                  701/301

(Continued)

OTHER PUBLICATIONS

R. Jungnickel and F. Korf, "Object tracking and dynamic estimation on evidential grids," 17th International IEEE Conference on Intelligent Transportation Systems (ITSC), Qingdao, 2014, pp. 2310-2316, doi: 10.1109/ITSC.2014.6958060. (Year: 2014).*

(Continued)

*Primary Examiner* — Nicholas K Wiltey
(74) *Attorney, Agent, or Firm* — Viering, Jentschura & Partner mbB

(57) ABSTRACT

Various aspects of this disclosure provide an area occupancy determining device. The device may include a memory configured to store at least one occupancy grid of a predetermined region, and a processor. The processor may be configured to generate the occupancy grid of the predetermined region. The occupancy grid includes a plurality of grid cells, each grid cell framed by respective grid cell frame lines. At least some of the grid cells have been assigned an information about the occupancy of the region represented by the respective grid cell. The processor may further be configured to dynamically update the occupancy grid, thereby successively generating a plurality of updated occupancy grids. Each updated occupancy grid is moved relative to the previous occupancy grid such that an origin coordinate of the updated occupancy grid is positioned on a contact point of grid cell frame lines of adjacent grid cells.

20 Claims, 12 Drawing Sheets

(56) References Cited

U.S. PATENT DOCUMENTS

| | | | | |
|---|---|---|---|---|
| 2010/0332475 | A1* | 12/2010 | Birdwell | G06K 9/6224 707/737 |
| 2011/0238309 | A1* | 9/2011 | Tsunekawa | B60R 21/0134 701/301 |
| 2014/0005933 | A1* | 1/2014 | Fong | G01C 21/20 701/447 |
| 2014/0195112 | A1* | 7/2014 | Lu | B60G 17/0165 701/37 |
| 2014/0244151 | A1* | 8/2014 | Matsubara | B60W 10/20 701/301 |
| 2014/0307247 | A1* | 10/2014 | Zhu | G01S 17/931 356/4.01 |
| 2015/0046078 | A1* | 2/2015 | Biess | G08G 1/163 701/301 |
| 2015/0071541 | A1* | 3/2015 | Qutub | G06T 7/187 382/173 |
| 2015/0235101 | A1* | 8/2015 | Belman | G06K 9/4647 348/222.1 |
| 2015/0353083 | A1* | 12/2015 | Hasberg | G05D 1/0274 701/1 |
| 2016/0026898 | A1* | 1/2016 | Abad | G06K 9/00785 382/103 |
| 2016/0140718 | A1* | 5/2016 | Ishida | H04N 13/239 345/419 |
| 2016/0210735 | A1* | 7/2016 | Fukushima | G06K 9/00805 |
| 2016/0252342 | A1* | 9/2016 | Feldmann | G01C 21/00 701/408 |
| 2016/0267335 | A1* | 9/2016 | Hampiholi | G06F 3/013 |
| 2017/0060133 | A1* | 3/2017 | Seo | G08G 1/143 |
| 2017/0247036 | A1* | 8/2017 | Halder | G01S 13/42 |
| 2017/0256071 | A1* | 9/2017 | Laugier | B60W 40/04 |
| 2018/0101720 | A1* | 4/2018 | Liu | G01S 7/4808 |
| 2018/0203445 | A1* | 7/2018 | Micks | G06N 7/005 |
| 2018/0225968 | A1* | 8/2018 | Wang | G01S 19/45 |
| 2018/0300561 | A1* | 10/2018 | Steyer | G05D 1/0274 |
| 2018/0339710 | A1* | 11/2018 | Hashimoto | B60W 40/04 |
| 2018/0345958 | A1* | 12/2018 | Lo | G05D 1/0088 |
| 2018/0348770 | A1* | 12/2018 | Yasui | G05D 1/0088 |
| 2018/0361912 | A1* | 12/2018 | Daiku | F21S 41/16 |
| 2018/0362030 | A1* | 12/2018 | Ohl | G05D 1/0274 |
| 2019/0049580 | A1* | 2/2019 | Natroshvili | B60W 40/10 |
| 2019/0049974 | A1* | 2/2019 | Kato | G08G 1/166 |
| 2019/0072971 | A1* | 3/2019 | Kato | G06K 9/00805 |
| 2019/0087667 | A1* | 3/2019 | Foroughi | G01S 13/931 |
| 2019/0155290 | A1* | 5/2019 | Luo | G05D 1/0274 |
| 2019/0186940 | A1* | 6/2019 | Hwang | B62D 15/0265 |
| 2019/0226854 | A1* | 7/2019 | Geissler | G06T 7/70 |
| 2019/0258876 | A1* | 8/2019 | Liu | G06T 17/10 |
| 2019/0258878 | A1* | 8/2019 | Koivisto | G05D 1/0246 |
| 2019/0317520 | A1* | 10/2019 | Zhang | B60W 50/0098 |
| 2019/0326669 | A1* | 10/2019 | Gaines | H01Q 3/20 |
| 2019/0340522 | A1* | 11/2019 | Mori | G06N 20/00 |
| 2019/0384309 | A1* | 12/2019 | Silva | G01S 17/931 |

OTHER PUBLICATIONS

Radu Danescu et al., "Modeling and Tracking the Driving Environment With a Particle-Based Occupancy Grid", IEEE Transactions on Intelligent Transportation Systems, Dec. 2011, pp. 1331-1342, vol. 12, No. 4.

Georg Tanzmeister et al., "Evidential Grid-Based Tracking and Mapping", IEEE Transactions on Intelligent Transportation Systems, Jun. 2017, pp. 1454-1467, vol. 18, No. 6.

Dominik Nuss et al., "Fusion of Laser and Radar Sensor Data with a Sequential Monte Carlo Bayesian Occupancy Filter", 2015 IEEE Intelligent Vehicles Symposium (IV), Jun. 28-Jul. 1, 2015, pp. 1074-1081, Seoul, Korea.

* cited by examiner

AREA OCCUPANCY DETERMINING DEVICE

TECHNICAL FIELD

Various aspects of this disclosure relate generally to an area occupancy determining device.

BACKGROUND

Perception is an important component of Automatic Driving (AD) as well as of many real life applications and devices. In a conventional approach, an object was detected and tracked using a so-called bounding box approach. However, there are objects that cannot be represented by means of a bounding box.

Dynamic Occupancy Grids (DOG) are usually provided to identify static and dynamic obstacles and free spaces simultaneously. This approach is based on so-called particle filters which combine the measurements from the sensors with the expectations of the Perception component of an Automatic Driving System. However, in a conventional approach to DOGS, an increase of the precision results in an increase in the number of particles which is often difficult to implement in a real time implementation.

SUMMARY

Various aspects of this disclosure provide an area occupancy determining device. The device may include a memory configured to store at least one occupancy grid of a predetermined region, and a processor. The processor may be configured to generate the occupancy grid of the predetermined region. The occupancy grid includes a plurality of grid cells, each grid cell framed by respective grid cell frame lines. At least some of the grid cells have been assigned an information about the occupancy of the region represented by the respective grid cell. The processor may further be configured to dynamically update the occupancy grid, thereby successively generating a plurality of updated occupancy grids. Each updated occupancy grid is moved relative to the previous occupancy grid such that an origin coordinate of the updated occupancy grid is positioned on a contact point of grid cell frame lines of adjacent grid cells.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various embodiments of the disclosure are described with reference to the following drawings, in which.

DESCRIPTION

Figure 1:
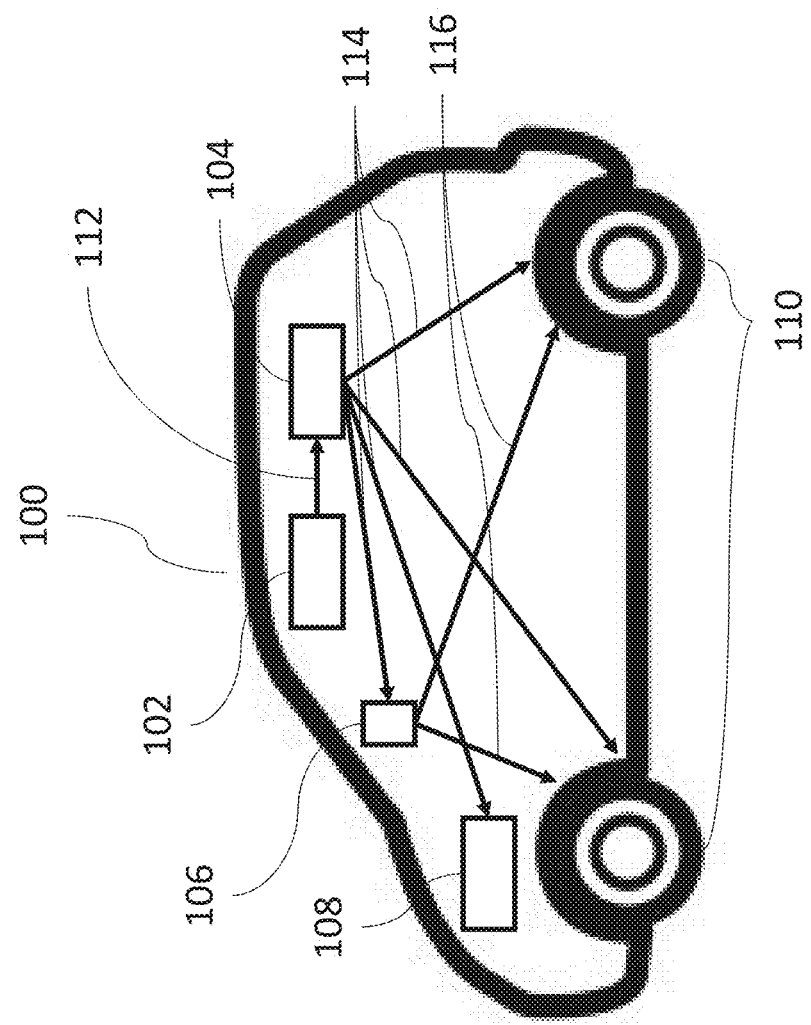
FIG. 1 shows an automatic driving vehicle including an area occupancy determining device, a controller of the automatic driving vehicle and automotive components such as a steering module, a motor, and wheels which may also include a braking system and a turning system.

The following detailed description refers to the accompanying drawings that show, by way of illustration, specific details and embodiments in which the disclosure may be practiced.

The word "exemplary" is used herein to mean "serving as an example, instance, or illustration". Any embodiment or design described herein as "exemplary" is not necessarily to be construed as preferred or advantageous over other embodiments or designs.

To increase the speed of obstacle perception e.g. in automatic driving (e.g. autonomous driving), various aspects of this disclosure propose a new approach to the occupancy grid coordinate system. In this approach, the center of the grid map illustratively does not move with the center of the vehicle; rather the occupancy grid center moves only with the integer multiples of the cell sizes (in other words, moves from one cell grid crossing point to another cell grid crossing point). As a consequence, as the vehicle moves and the occupancy grid moves with it, the location of static particles in the moved occupancy grid coordinates system can be easily and quickly computed. In addition, in various aspects of this disclosure, the number of grid cells may be reduced by using grid cells of different size which provide different perception resolution.

In an exemplary implementation, smaller grid cells could be used in the center of the occupancy grid close to the vehicle, for example, for higher resolution while larger grid cells could be used at the periphery of the grid where the precise obstacle position is not so critical. The combined effect of simplified computation and grid cell number reduction may result in a reduction of perception speed.

The following detailed description refers to the accompanying figures that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

Whereas the description and the figures refer to an example of Automatic Driving (AD), it should be understood that the area occupancy determining device disclosed as well as the examples disclosed in general may be used in a wide range of applications including security cameras that may use the area occupancy determining device to monitor access to a given area, traffic lights that that may use the area occupancy determining device to monitor the traffic waiting at an intersection, smart digital signage for both advertisement and information purposes that may use the area occupancy determining device to monitor estimate the number of impressions or to derive the most relevant content to display, traffic congestion sensors that may use the area occupancy determining device to estimate the traffic in a given area. Furthermore, it should be noted that the examples may also be provided for the description of the environment in general, e.g. for tracking of objects in the environment.

FIG. 1 shows an automatic vehicle (e.g. an autonomous vehicle) 100 including an area occupancy determining device 102 (which may include any kind of logic, e.g. a processor), a controller 104 of the automatic driving vehicle 100 and various automotive components such as a steering module 106, a motor 108, and wheels 110 which may also include a braking system and a turning system. It should be noted that the automatic driving vehicle 100 may include various more or other components which are not described in detail. Furthermore, the automatic vehicle 100 may be an automatic driving car 100, an automatic drone 100, an automatic plane or other flying object, an automatic bike, trike, or the like. As an alternative, the automatic vehicle 100 may be any kind of robot or moveable hardware agent. Furthermore, it is to be noted that the vehicle does not necessarily need to be an automatic vehicle, but can also be a partially automatic vehicle or a vehicle in which the occupancy grid processes are just user assistance systems.

Whereas the disclosure below may be relevant for automatic vehicles (e.g. autonomous vehicles), more generally it may be relevant for any device requiring a map of a given area, such as surveillance devices which may monitor a specific location. Such devices may also be fixed in a specific position.

The area occupancy determining device 102 may be configured to perceive the environment determining the area(s) that may be occupied by at least one obstacle and area(s) that may be free of any obstacle. The controller 104 of the automatic vehicle 104 may be configured to control the direction and speed of the automatic vehicle 104.

FIG. 1 also shows an exemplary connection scheme across the different components. A first connection 112 between the area occupancy determining device 102 and the controller 104 may be configured to provide an exemplary information flow from the area occupancy determining device 102 to the controller 104 through which the area occupancy determining device 102 provides e.g. the position of free and occupied spaces close to the automatic vehicle (e.g. autonomous vehicle) 100 to the controller 104.

The first connection 112 and any other connections which will be described below may be implemented as a wired connection or a wireless connection. Any kind of communication protocol may be used for a communication between two respective components.

The information passed through the first connection 112 may be a description of an occupancy grid determined by the area occupancy determining device 102 as will be described in more detail below.

Each one of the second connections 114 are provided to couple the controller 104 with the other components, such as the steering module 106, the motor 108, and the wheels 110, and the like. The second connections 114 may be configured to provide an information flow from the controller 104 to the various automotive components: e.g. the steering module 106, the motor 108, and the wheels 110.

The controller 104 may be configured to communicate with the motor 108 to e.g. instruct the motor 108 to increase the vehicle speed. As an alternative, the controller 104 may communicate with a braking system of the wheels 110 to instruct the braking system to stop the vehicle.

Furthermore, the controller 104 may communicate with the steering module 106 to modify the driving direction of the automatic vehicle 100.

Each one of the third connections 116 shows a connection between the steering module 106 and a respective wheel 110 to provide an information flow between the steering module 106 and the wheels 110.

The steering module 106 may communicate to a turning system (not shown) of the wheels 110 to change a respective wheel angle with respect to the direction of the automatic vehicle 100 forcing the automatic vehicle 100 to change direction. In an implementation of the automatic driving vehicle 100, the steering module 106 may be configured to mechanically change the angle of a respective wheel 110 with respect to the direction of the automatic vehicle 100 forcing the automatic vehicle 100 to change direction. The steering module 106 may be a component of a wheels control system (not shown).

Figure 2:
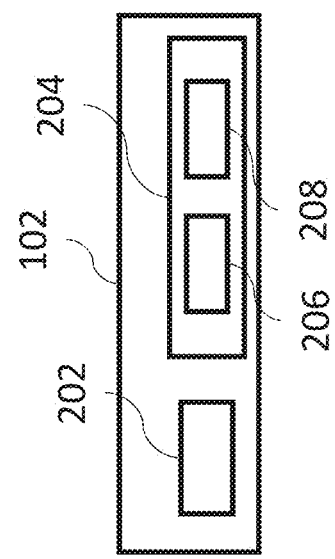
FIG. 2 shows details of the area occupancy determining device.

FIG. 2 shows the area occupancy determining device 102 in more detail. The area occupancy determining device 102 may include one or a plurality of sensors 202 and one or more computing devices 204 to process the information provided by the one or more sensors 202 to generate an occupancy grid of a predetermined region.

The plurality of sensors 202 are designed to detect information about the predetermined region used to generate the occupancy grid. The plurality of sensors may include at least one of the following sensors: a camera (e.g. a stereo camera and/or an infrared camera or the like), a radar sensor, or a lidar sensor.

The one or more computing devices 204 may in each case include a processor 206 and a memory 208 to store the generated occupancy grids.

The processor 206 may be configured to generate the occupancy grid of the predetermined region and dynamically update the occupancy grid, thereby successively generating a plurality of updated occupancy grids (thus, the occupancy grid may also be referred to as dynamic occupancy grid (DOG)). The memory 208 may store the generated occupancy grids.

Figure 3:
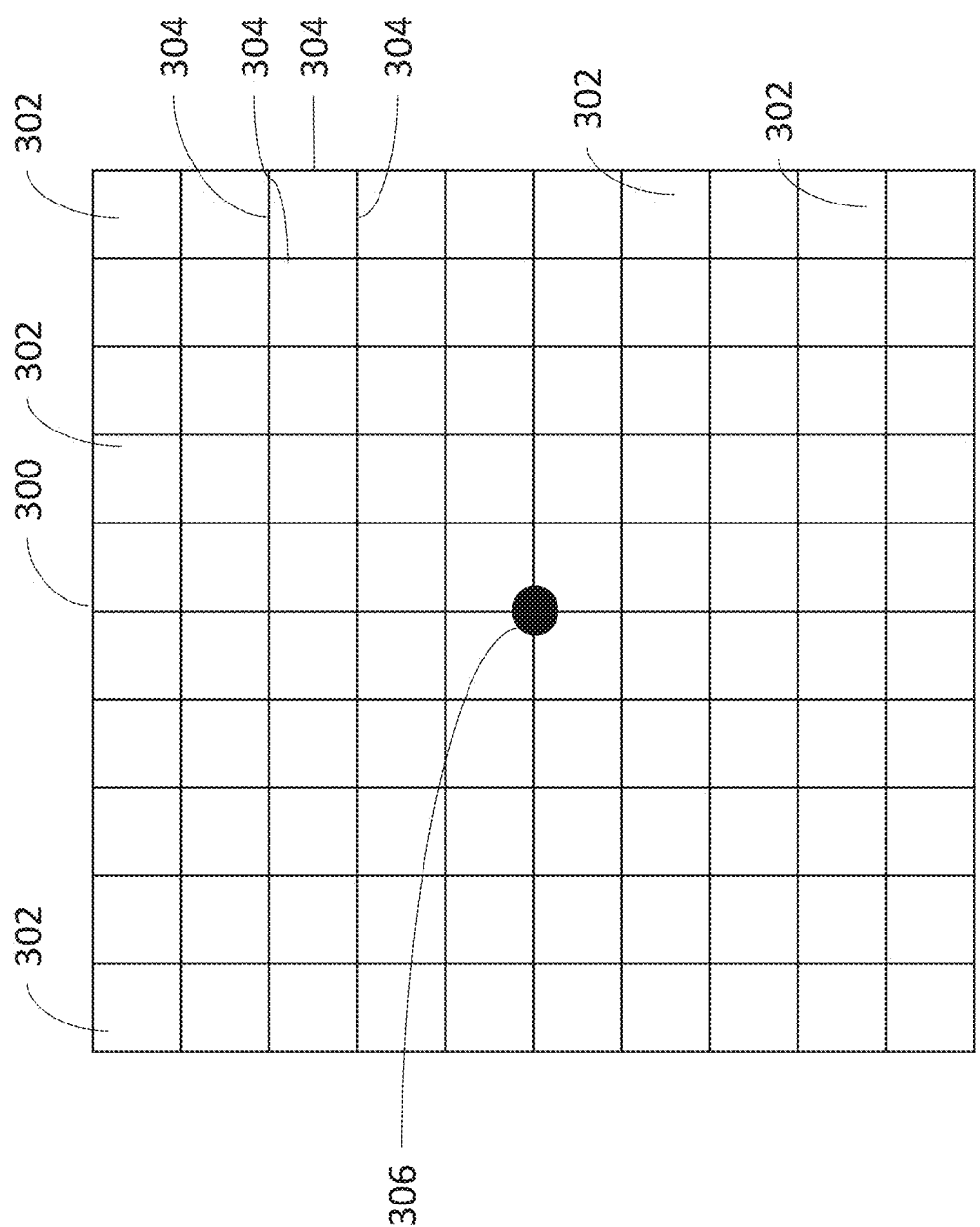
FIG. 3 shows an occupancy grid.

FIG. 3 shows an example of an occupancy grid 300 including a plurality of grid cells 302. Each grid cell 302 is framed by respective grid cell frame lines 304, and at least some of the grid cells 302 have been assigned an information about the occupancy of the region represented by the respective grid cell 302.

The grid cells 302 of the occupancy grid 300 may have substantially the same size and rectangular shape. The grid cell size may be in the range from about 5 cm by 5 cm to about 1 m by 1 m, e.g. in the range from about 10 cm by 10 cm to about 50 cm by 50 cm. It is to be noted that the grid cells 302 do not need to be of the same size or shape. By way of example, the grid cells 302 do not need to be rectangular but in general may have any desired shape.

The grid cell sizes given above are exemplary for AD applications, but it should be understood that such size may change with the specific application. Applications needing higher resolution will use smaller cells sizes, applications requiring smaller resolution may use larger cells sizes.

Point 306 shows the center 306 of the occupancy grid 300.

The center 306 of the occupancy grid 300 is assumed to correspond to the position of the center of the automatic vehicle 100.

The center 306 of the occupancy grid 300 corresponds to an approximation of the position of the center of the automatic vehicle 100.

The occupancy grid 300 may move with the automatic vehicle 100.

Furthermore, the orientation of the occupancy grid 300 may be independent of the orientation of the automatic vehicle 100. The orientation of the occupancy grid 300 may be generated (e.g. for the first time) when the automatic vehicle 100 starts.

Figure 4:
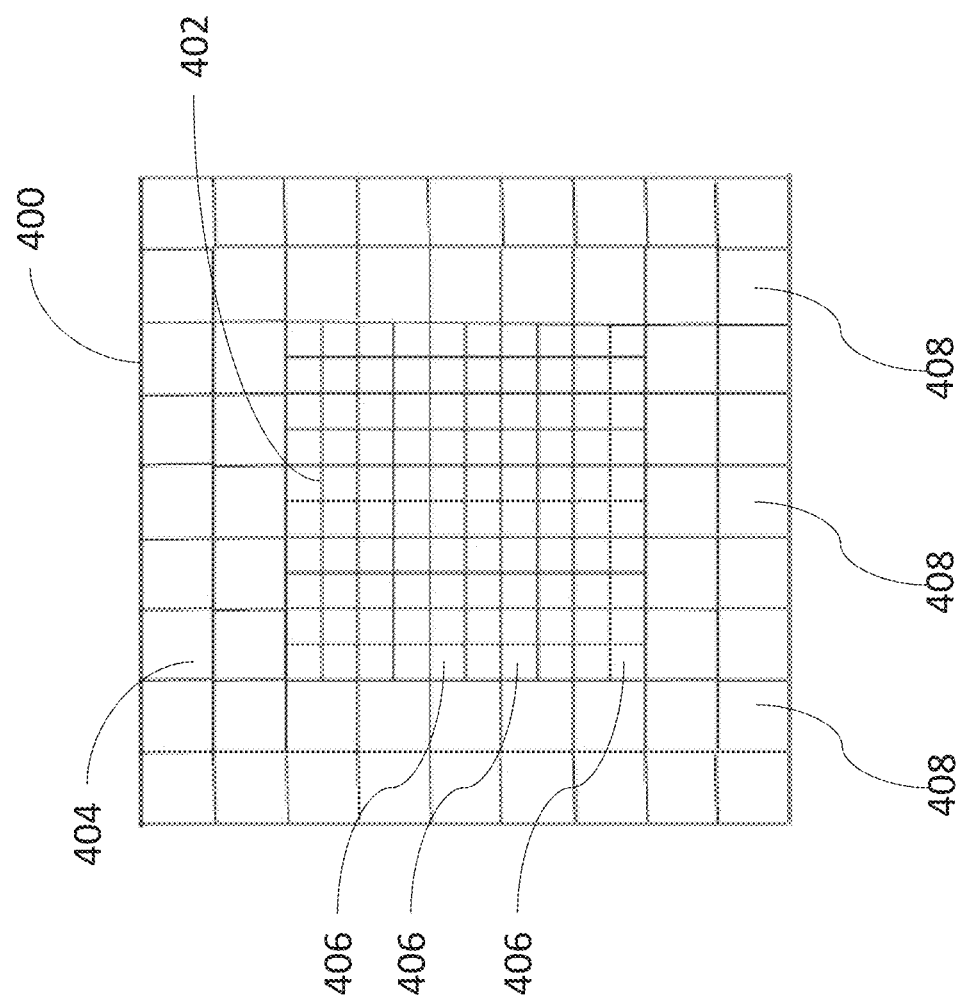
FIG. 4 shows a non-homogeneous occupancy grid.

FIG. 4. shows a non-homogeneous occupancy grid 400 having a first region 402 and a second region 404, whereby the size of first grid cells 406 in the first region 402 is smaller than the cell size of the second grid cells 408 in the second region 404.

The non-homogeneous occupancy grid cells with smaller size (in other words the first grid cells 406) may be located close to the center of the occupancy grid 400 where the automatic vehicle 100 may be to provide a higher resolution map of the objects around the autonomos vehicle 100. The non-homogeneous occupancy grid cells with larger size (in other words the second grid cells 408), to provide a lower resolution perception of obstacles which are further to the automatic vehicle 100. In general, an arbitrary number of grid cells of different sizes may be provided, wherein the size of the grid cells within the non-homogeneous occupancy grid may increase with increased distance from the center of the occupancy grid 400 (or in general with increased distance from a reference point of the occupancy grid 400).

The larger grid cells may be arranged further away from the center of the occupancy grid 300 than the smaller grid cells, thereby reducing the resolution in areas distant from the vehicle where occupancy precision is not so critical.

In addition, in non-homogeneous occupancy grids a plurality of areas with different size cells may be used. The size of the cells in the different areas may increase by an integer factor of e.g. 2, 4, 6, 8, 10, etc., for example with increasing distance from the center of the occupancy grid or from another reference point of the occupancy grid.

Furthermore, different coordinate systems may be utilized. Examples of such coordinate systems may include the cartesian coordinate system and the polar coordinate system.

Figure 12:
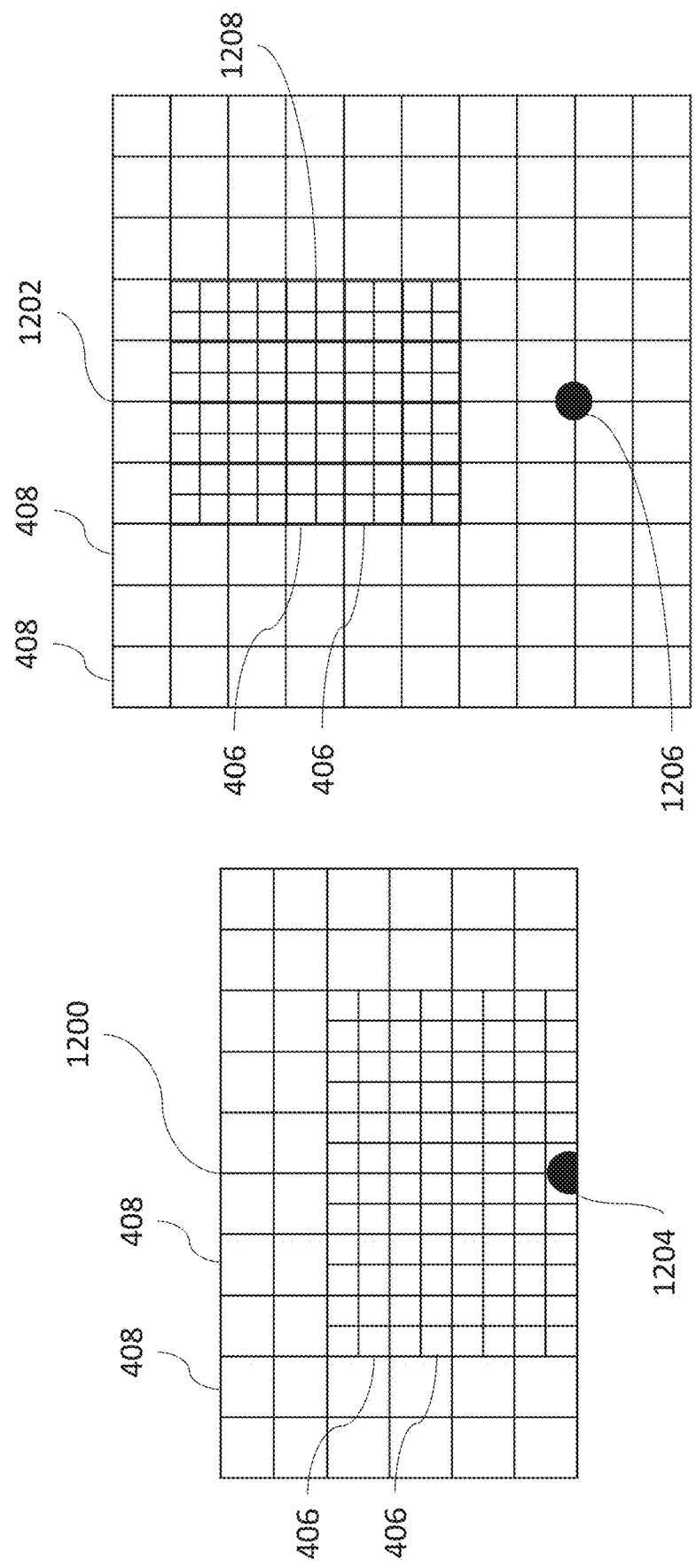
FIG. 12 shows cases two non-homogeneous occupancy grids in which the automatic vehicle may not be at the center of the non-homogeneous occupancy grid, but in any other position including at the edge of the non-homogeneous occupancy grid.

In some non-homogeneous occupancy grids, the authonomous vehicle may not be at the center of the non-homogeneous occupancy grid, but in any other position including at the edge of the non-homogeneous occupancy grid. One such case is the non-homogeneous occupancy grid 1200 shown in FIG. 12. As in the non-homogeneous occupancy grid 400, the non-homogeneous occupancy grid 1200 contains smaller cells 406 and larger cells 408, but in 1200 an authonomous vehicle 1204 is at the edge of the grid. A non-homogeneous occupancy grid like 1200 may be used by an authonomous vehicle with sensors directed in one direction only, for example only forward sensing.

Other non-homogeneous occupancy grids, such as the non-homogeneous occupancy grid displayed in 1202 also contains smaller cells 406 and larger cells 408, but the authonomous vehicle, or a type of mapping device, 1206 may be completely outside the small cells area 1208. A non-homogeneous occupancy grid like 1202 may be used by an authonomous vehicle that attempts to analyze the area forward, or by surveillance device looking at an area somewhat far from its position.

Figure 5:
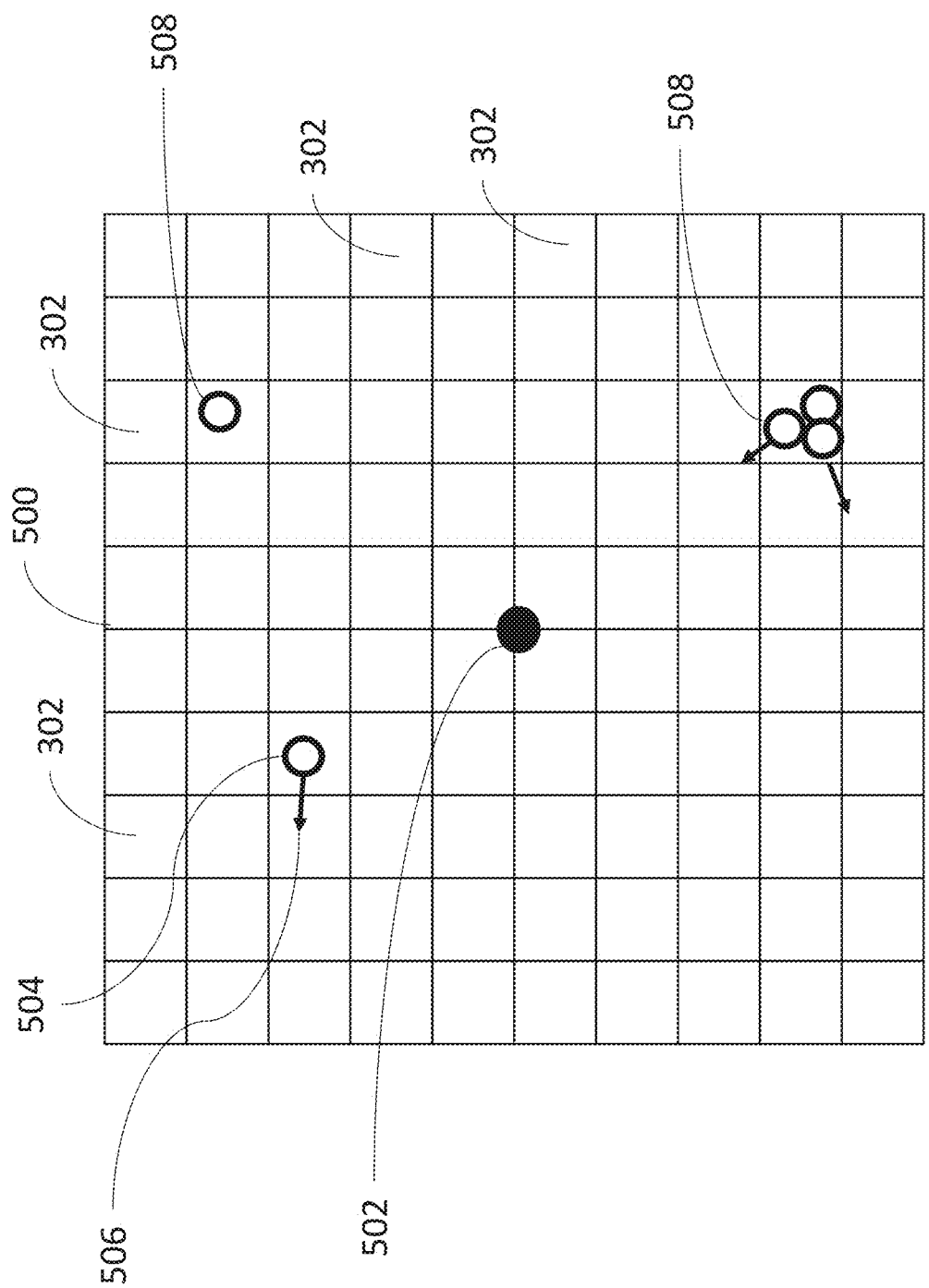
FIG. 5 shows particles in an occupancy grid.

FIG. 5 shows particles in an occupancy grid 500.

Particles may initially be generated through sensor measurements. Particles may be characterized by a position, a direction, and a velocity. Particles that are associated to a position may be placed within the grid cells 302 which cover that respective position. Predictions may be made on a particle's future position in a occupancy grid 300. Particles illustratively represent an hypothesis that a respective grid cell 300 of an occupancy grid 500 is occupied by some object or not. A belief mass can be associated with particles, whereby a belief mass may indicate the likelihood that the particle is in a given grid cell 302. Alternatively, the belief mass associated with a particle may indicate a likelihood that the particle moves at a given speed.

In FIG. 5, a first circle 504 represents a particle in the occupancy grid 500. Furthermore, an arrow 506 attached to the first particle 504 represents its direction and its velocity through the length of the arrow 506. Particles with non-zero velocity may be referred to as dynamic particles.

A second circle 508 represents a particle with zero velocity. Particles with zero velocity may also be referred to as static particles As shown in FIG. 5, a plurality of particles may be contained in a grid cell (such as e.g. grid cell 508).

The degree of occupancy of a grid cell 302 is characterized by a number of particles detected in the respective grid cell 302. The higher the number of particles in a grid cell 302, the stronger is the hypothesis that the grid cell 302 is occupied by an object, e.g. an obstacle.

Furthermore, the grid cells 302 may be associated with a velocity. The velocity of a grid cell 302 can be computed by a mathematical combination of the velocity of the particles in the respective grid cell 302.

An exemplary method for computing the mathematical combination of the velocity of the particles in a respective grid cell 302 may be the mean velocity of the particles that are contained in the respective grid cell 302.

The grid cells 302 may be associated with belief masses about their occupancy. The grid cells 302 may be associated with belief masses about the speed of their particles.

An exemplary method for associating belief masses to a grid cell 302 may be the mean of the belief masses of the particles that are located in the respective grid cell 302.

Figure 6:
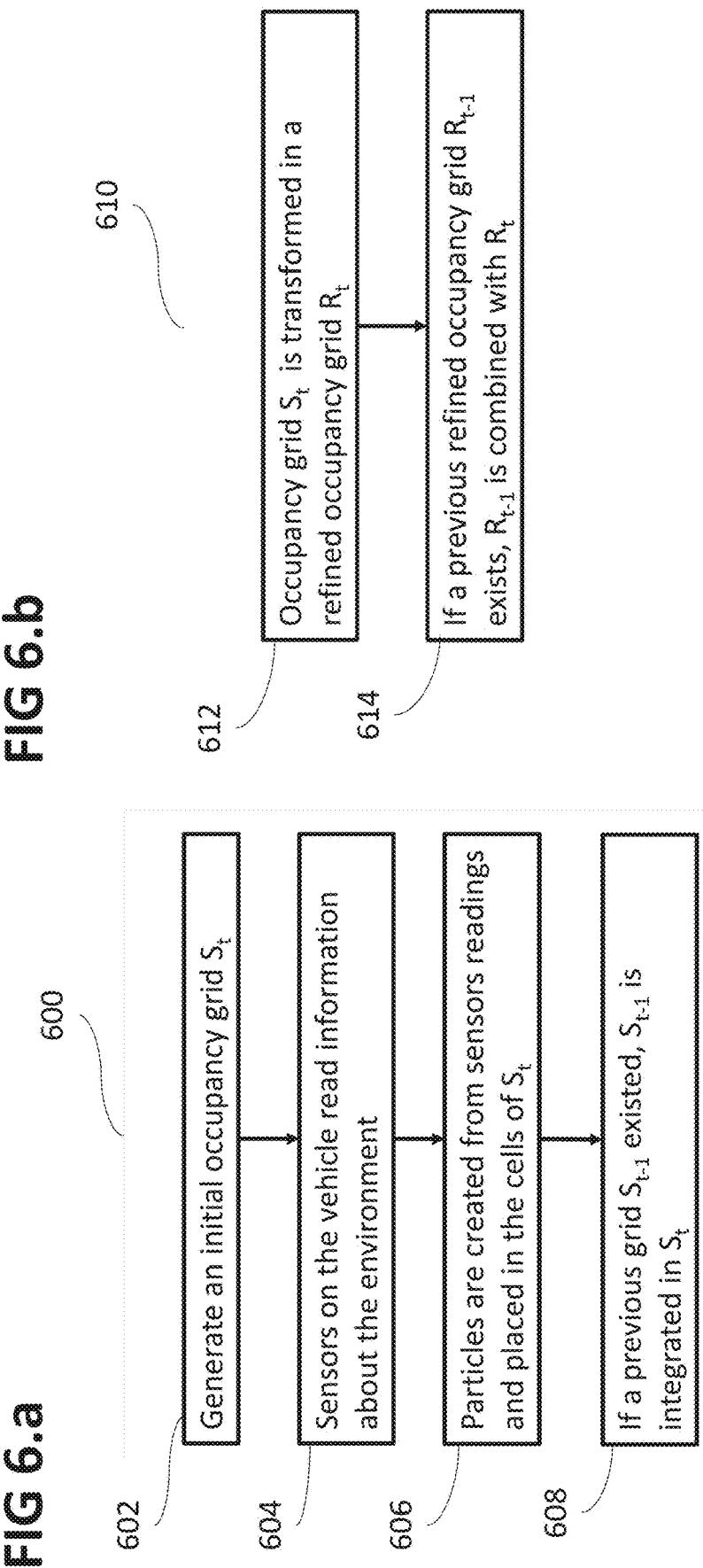
FIG. 6a shows a flow diagram illustrating a method for placing particles in an occupancy grid based on the sensor's readings.
FIG. 6b shows a flow diagram illustrating a method for refining the position of a particle using belief masses.

FIG. 6a shows a flow diagram 600 illustrating a method for placing particles in an occupancy grid based on the sensors' readings. The method may be performed by the area occupancy determining device 102. The method may include:

In 602, an occupancy grid $S_t$ is generated.

Figure 11:
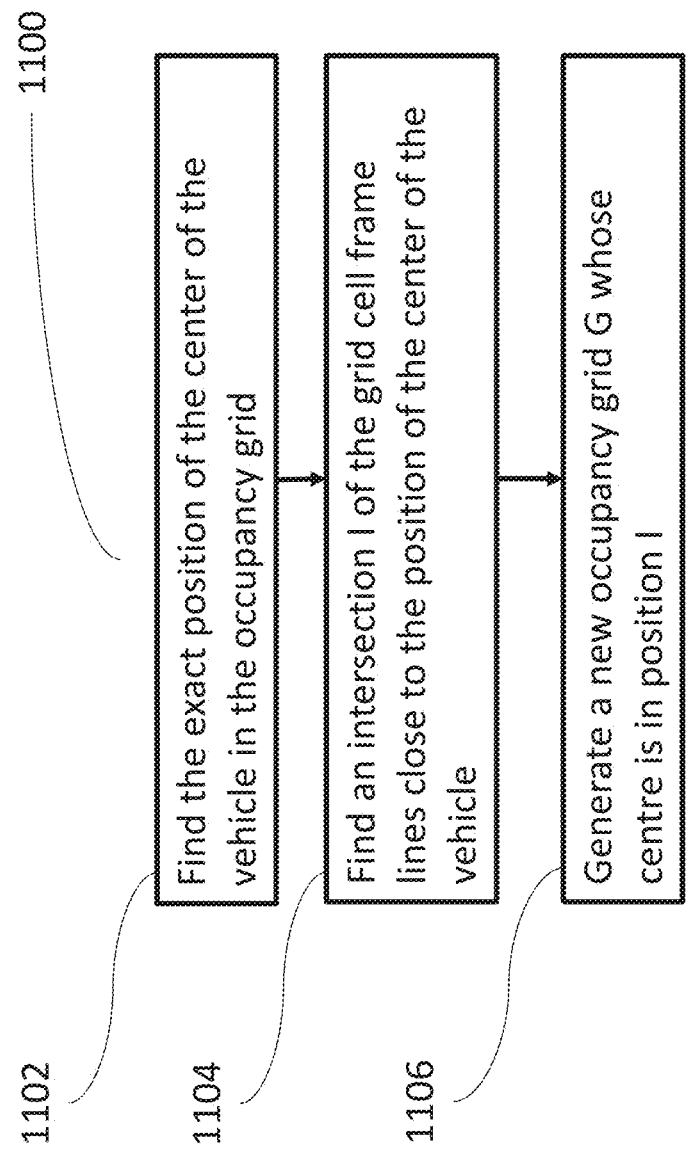
FIG. 11 shows a flow diagram illustrating a method for updating the occupancy grid.

The occupancy grid $S_t$ may be an empty grid. The occupancy grid $S_t$ may contain random particles. The random particles may be sampled from a uniform distribution. The occupancy grid $S_t$ may be generated in accordance with the method 1100 as shown in FIG. 11, which will be described in more detail below.

In 604, sensors (e.g. sensors 204) of the automatic vehicle 100 read information about the environment.

In 606, particles are created from the sensor readings and placed in the grid cells of the occupancy grid $S_t$.

An exemplary method for computing the number of particles generated in a respective grid cell i (i designates a grid cell index) is:

$$|\chi^i| = |n_\chi^{max} m^i(S,D)|, \quad (1)$$

wherein $n_\lambda^{max}$ is the maximum number of particles that can be placed in a grid cell, and $m^i(S,D)$ are the belief masses of dynamic and static (according to Demster-Shafer theory) grid cells for lidar, radar or sensor fused result. If $|\chi^i|$ is below a given threshold, no particles are generated for grid cell i and grid cell i is expected (in other words classified) to be free.

In 608, if a previous occupancy grid $S_{t-1}$ existed, then the previous occupancy grid $S_{t-1}$ is integrated into the current occupancy grid $S_t$.

The previous occupancy grid $S_{t-1}$ may be integrated into the current occupancy grid $S_t$ using a particle filter.

An exemplary method for sampling the particle velocity $p(v_0^i|z_0^i)$ in the particle filter is given by $$p(v_0^i|z_0^i) = w_{dyn} \cdot U\left(\begin{pmatrix}-v_{max}\\-v_{max}\end{pmatrix}, \begin{pmatrix}v_{max}\\v_{max}\end{pmatrix}\right) + w_{static} \cdot \delta\begin{pmatrix}0\\0\end{pmatrix} \quad (2)$$

$$w_{dynamic} + w_{static} = 1$$

wherein U is the uniform distribution, w is the weight of the particles, and $$\delta\begin{pmatrix}0\\0\end{pmatrix}$$

is the Dirac distribution for static particles.

An exemplary method for propagating dynamic particles is given by $$x_{t,[k]} = x_{t-1,[k]} + \Delta t v_{t-1,[k]} + N(0, \text{diag}(\sigma^2_{nx}, \sigma^2_{ny})). \quad (3)$$

wherein $\sigma^2_{nx}$ and $\sigma^2_{ny}$ are the radial velocities standard deviations as derived from the particle filters; and $x_{t,[k]}$ represents the position of particle k at time t.

An exemplary method for computing the following expected speed is $$v_{t,[k]} = v_{t-1,[k]} + N(0, \text{diag}(\sigma^2_{nv}, \sigma^2_{nv})). \quad (4)$$

Furthermore the expected position of static particles can be calculated by the inverse of the shift of the current occupancy grid $S_t$ with respect to the previous occupancy grid $S_{t-1}$.

FIG. 6b shows a flow diagram 610 illustrating a method for refining the position of a particle using belief masses.

In 612, the current occupancy grid $S_t$ may be transformed in a refined current occupancy grid $R_t$ which is a refinement of $S_t$.

An exemplary method for transforming the current occupancy grid $S_t$ into the refined current occupancy grid $R_t$ may be performed through a copy function.

The method in 612 may result in the deletion of some particles.

In 614, if a refined previous occupancy grid $R_{t-1}$ exists, the refined previous occupancy grid $R_{t-1}$ is combined with the refined current occupancy grid $R_t$.

The refined previous occupancy grid $R_{t-1}$ is combined with the refined current occupancy grid $R_t$ using the so-called Dempster-Shafer theory of evidence.

Figure 7:
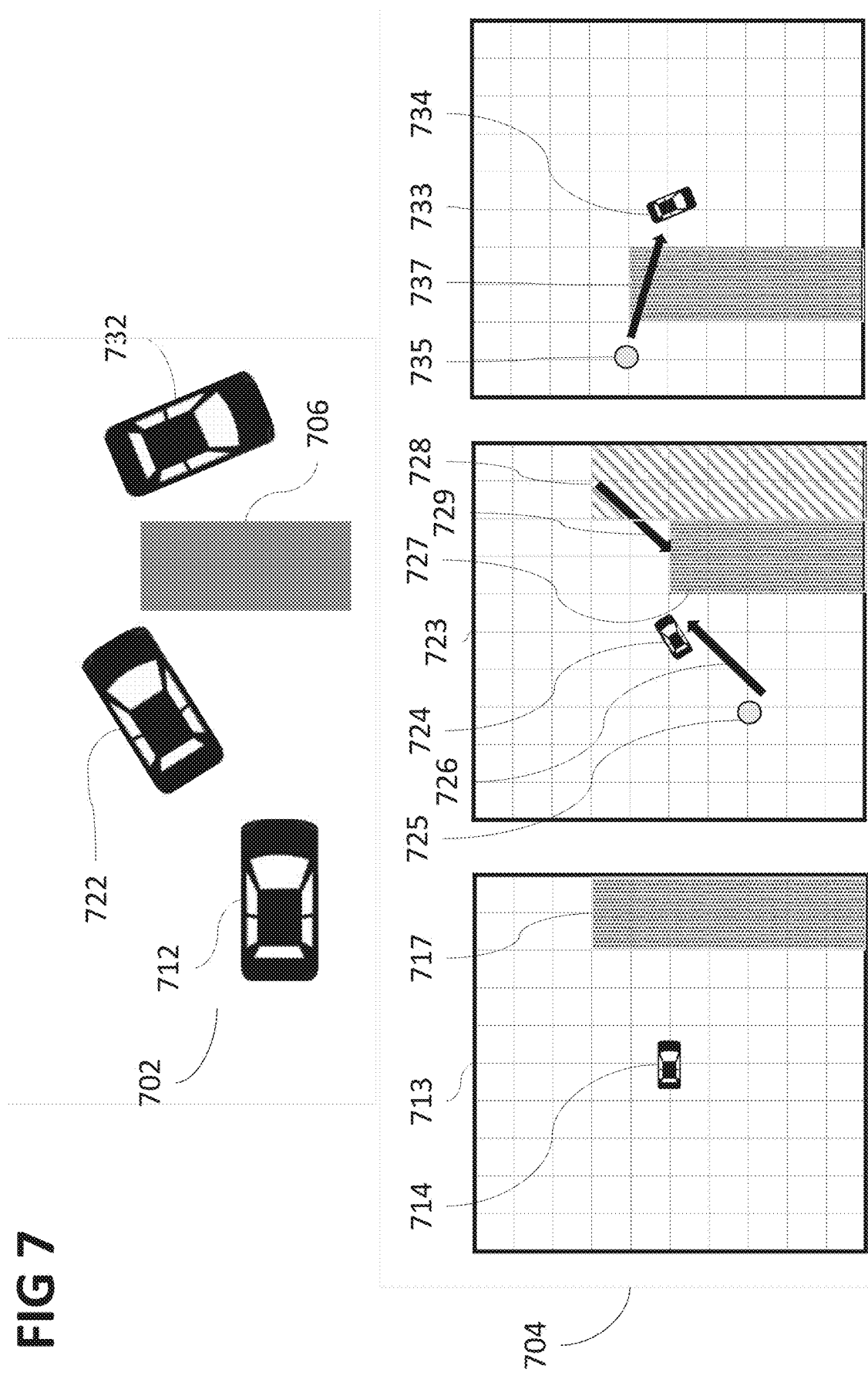
FIG. 7 shows an example of how an occupancy map changes to reflect changes of situation while a vehicle is driving around an obstacle.

FIG. 7 shows an example of how an occupancy map changes to reflect changes of a situation while a vehicle is driving around an obstacle. Diagram 702 shows a large obstacle 706 which which is too large to be delimited by a bounding box, and a vehicle in three different positions 712, 722, and 732 while the vehicle is driving around the obstacle 706. Diagram 704 shows three sub diagrams 713, 723, 733 illustrating occupancy grids 713, 723, and 733 corresponding to the three vehicle positions 712, 722, 732 over time.

A first sub diagram 713 shows a first occupancy grid 713 corresponding to a first vehicle position 712. In the first sub diagram 713, the first vehicle position 712 is assumed to be at the center of the first occupancy grid 713, as shown by icon 714. Furthermore the particles that represent the obstacle 706 in the first occupancy grid 713 are displayed by a first shaded region 717.

A second sub diagram 723 shows a second occupancy grid 723 corresponding to a second vehicle position 722. In the second sub diagram 723, the second vehicle position 722 is assumed to be at the center of the second occupancy grid 723, as shown by icon 724. Furthermore the particles that represent the obstacle 706 in the second occupancy grid 723 are displayed by a second shaded area 727.

For explanatory reasons, the second sub diagram 723 also shows by means of a dot 725 the projection of the previous position of the vehicle 712 onto the second occupancy grid 723; the grayed region 728 shows the position that the obstacle 706 took in the first sub diagram 713. An arrow 726 assigned to the dot 725 shows that following the vehicle the center of the first occupancy grid shifted of integer size steps of two cells up and two cells to the right.

The position of the particles 727 representing the obstacle 706 in the second occupancy grid 723 could be computed by taking the position of the particles in the first sub diagram 713 represented by the grayed region 728 and reversing the transformation shown by arrow 726 as shown by the arrow 729. In the specific example of the second sub diagram 723, the transformation shown by arrow 729 is a shift of integer size steps of two grid cells down and two grid cells to the left.

A third sub diagram 733 shows a third occupancy grid 733 corresponding to the third vehicle position 732. In the third sub diagram 733, the vehicle position is assumed to be at the center of the third occupancy grid 733, as shown by icon 734. Furthermore the particles that represent the obstacle 706 in the third occupancy grid 733 are displayed by a third shaded region 737.

For explanatory reasons, the third sub diagram 733 also shows by dot 735 the projection of the previous position of the vehicle 722 onto the third occupancy grid 733. Arrow 737 shows that the center of the third occupancy grid 733 shifted by integer size steps one grid cell downwards and four grid cells to the right.

Figure 8:
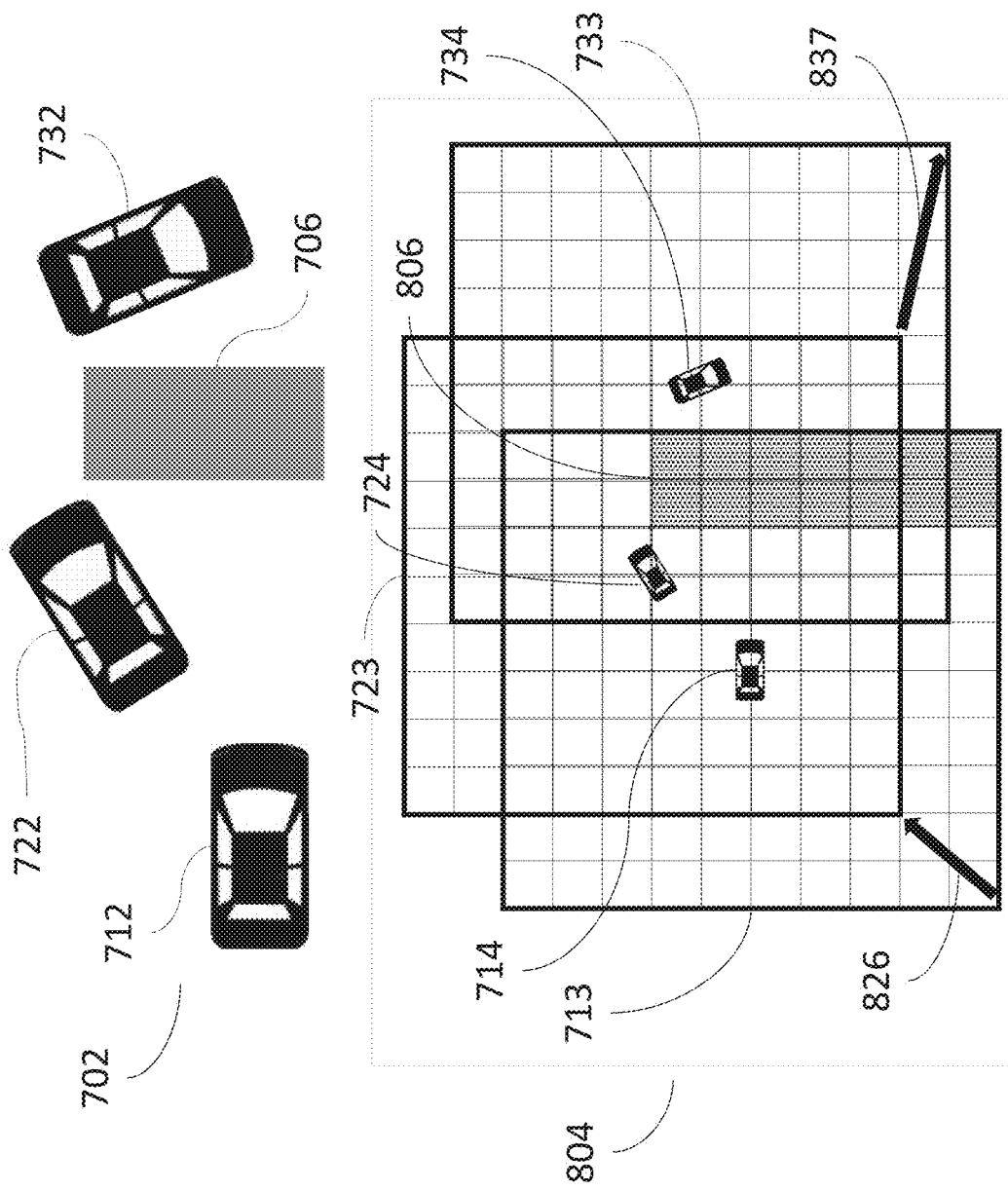
FIG. 8 shows an example of how an occupancy map changes to reflect changes of situation while a vehicle is driving around an obstacle by using overlapping occupancy grids.

FIG. 8 shows an example of how an occupancy map changes to reflect changes of situation while a vehicle is driving around an obstacle by using overlapping occupancy grids. Diagram 702 is displayed in FIG. 8 only for explanatory reasons. Diagram 804 shows the three sub diagrams 713, 723, and 733 showing the occupancy grids corresponding to the three vehicle positions 712, 722, 732.

Diagram 804 shows a different perspective on diagram 704 highlighting how the occupancy maps in sub diagrams 713, 723, and 733 shift with respect to each other over time as the vehicle moves.

A shaded region 806 represents the particles that represent the obstacle 706 in the occupancy grids 713, 723, and 733.

Arrow 826 shows that the occupancy grid displayed in the second sub diagram 723 is shifted by integer size steps of two cells upwards and two cells to the right with respect to the occupancy area displayed in the first diagram 713. This shift is equivalent to the shift represented by arrow 726.

Arrow 836 shows that the occupany grid displayed in the third diagram 733 is shifted by integer size steps of two cells upwards and two cells to the right with respect to the occupancy region displaced in the second diagram 723. This shift is equivalent to the shift represented by arrow 736.

Figure 9:
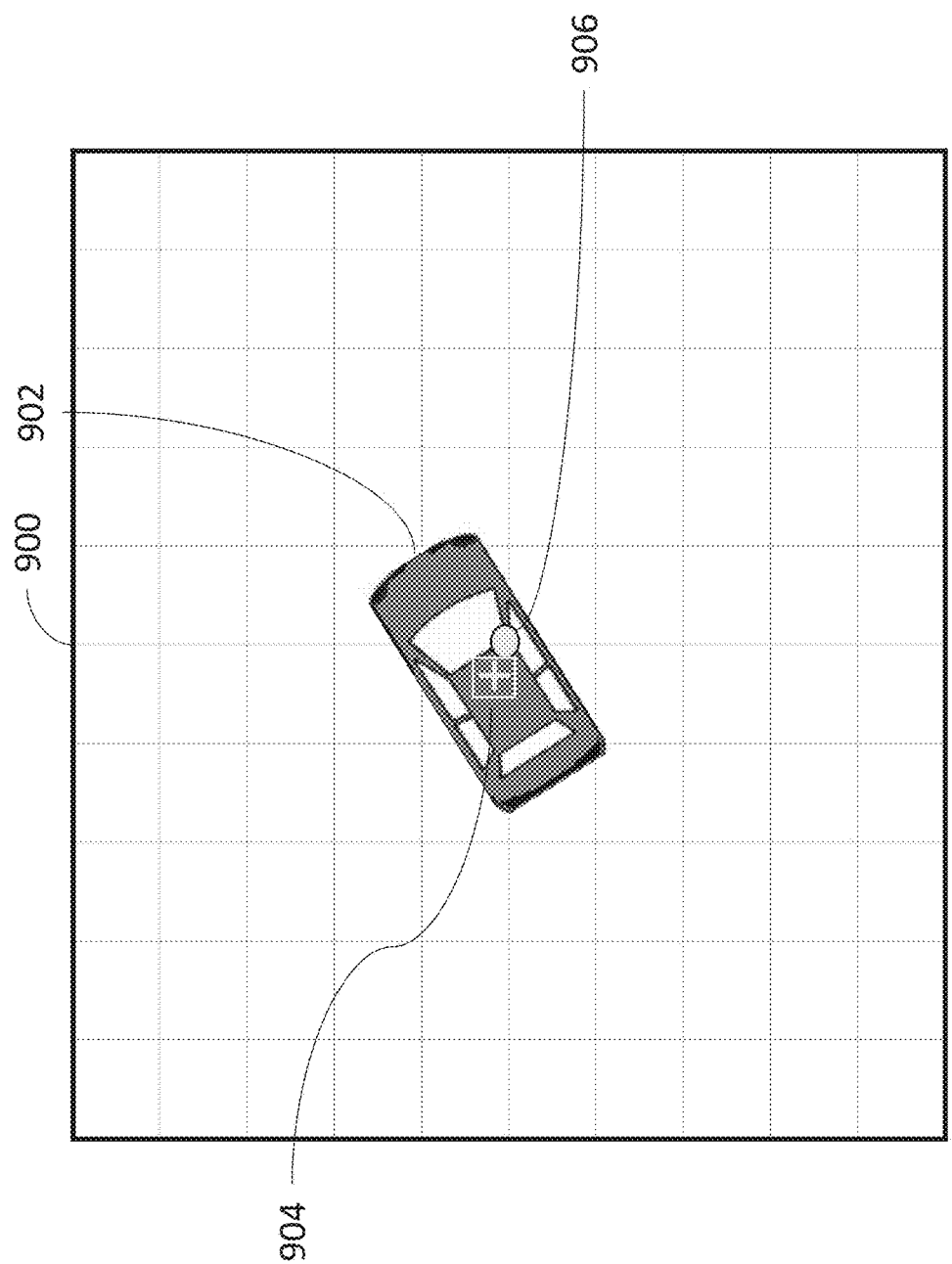
FIG. 9 shows a vehicle, an occupancy grid that is generated by the vehicle occupancy determining device, the center of the vehicle, and the center of a plurality of occupancy grids.

FIG. 9 shows a vehicle 902, an occupancy grid 900 that is generated by the vehicle occupancy determining device of the vehicle 902, the center 904 of the vehicle 902, and the center 906 of occupancy grid 900. Furthermore, FIG. 9 shows that while the occupancy grid 900 moves together with the vehicle 902, the center of the occupancy grid 906 may not be coinciding with the vehicle 902 center. Rather the center of the occupancy grid 900 may be close to the center of the vehicle 902, for example the center of the vehicle 902 may be in a grid cell whose edges lead to the center of the occupancy grid.

Figure 10:
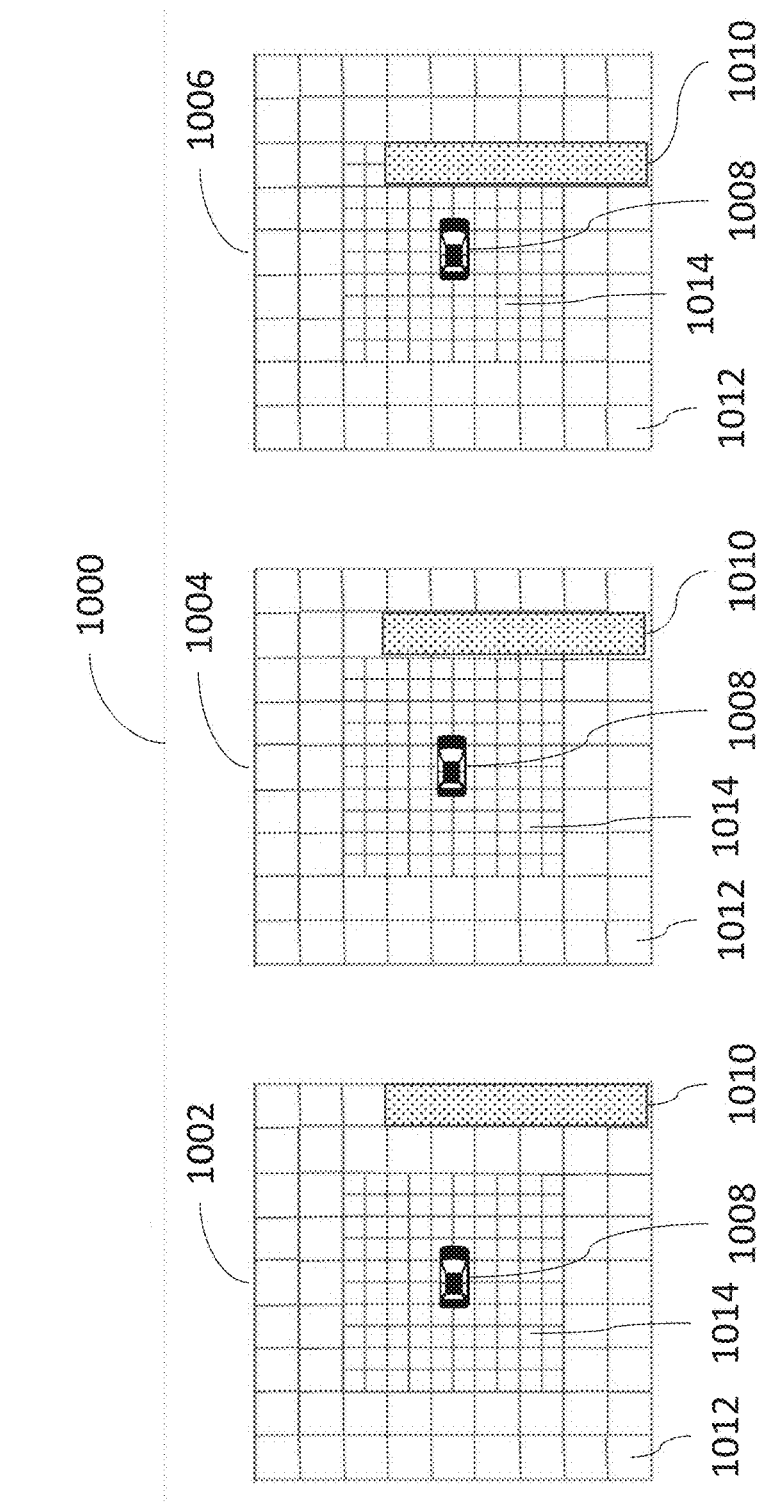
FIG. 10 shows a vehicle that approaches a large obstacle.

FIG. 10 shows a vehicle 1008 that approaches a large obstacle 1010. In 1000 are shown three different occupancy grids 1002, 1004, 1006 generated while the vehicle 1008 approaches an obstacle 1010.

In 1002, the vehicle 1008 is quite far from the obstacle 1010 so all particles are placed in rather large grid cells 1012 in an edge region (as an example of the second region; the edge region may partially or completely surround a central region) at the edge of the occupancy grid. In 1004, the vehicle 1008 is nearer to the obstacle 1010 but it is still quite far from the obstacle 1010 so all particles are placed in the rather large cells 1012 but no longer at the outer edge of the occupancy grid, but still in the edge region of the occupancy grid. In 1006, the vehicle 1008 is close to the obstacle 1010 so particles are placed in smaller cells 1014 in the central region (as an example of the first region) with a higher resolution.

The particles that were contained in the larger cells 1012 may be redistributed to smaller cells 1014.

The redistribution of particles from larger cells 1012 to smaller cells 1014 may be performed through a random distribution.

The redistribution of particles from larger cells 1012 to smaller cells 1014 may be performed through an equal number distribution.

FIG. 11 shows a flow diagram 1100 illustrating a method to shift an occupancy grid.

In 1102, the position of the center of a vehicle in the occupancy grid is determined.

In an example, 1102 can be performed by projecting onto the occupancy grid the current position of the vehicle.

In 1104, an intersection I of the grid cell frame lines close to the position of the center of the vehicle is determined.

In 1106, a new occupancy grid G is generated the center of which is in position I.

In the following, various examples are provided with reference to the aspects described above.

Example 1 is an area occupancy determining device. The device may include a memory configured to store at least one occupancy grid of a predetermined region, and a processor configured to generate the occupancy grid of the predetermined region, the occupancy grid including a plurality of grid cells, each grid cell framed by respective grid cell frame lines, and at least some of the grid cells having been assigned an information about the occupancy of the region represented by the respective grid cell, and to dynamically update the occupancy grid to successively generate a plurality of updated occupancy grids. Each updated occupancy grid is moved relative to the previous occupancy grid such that an origin coordinate of the updated occupancy grid is positioned on a contact point of grid cell frame lines of adjacent grid cells.

In Example 2, the subject matter of Example 1 can optionally include that the grid cells of the occupancy grid have substantially the same size.

In Example 3, the subject matter of any one of Examples 1 or 2 can optionally include that the grid cells of the occupancy grid have a cell size in the range from about 5 cm by 5 cm to about 1 m by 1 m.

In Example 4, the subject matter of any one of Examples 1 to 3 can optionally include that the grid cells of the occupancy grid have substantially the same cell shape.

In Example 5, the subject matter of Example 4 can optionally include that the grid cells of the occupancy grid have substantially a rectangular cell shape.

In Example 6, the subject matter of any one of Examples 1 to 5 can optionally include that the device further includes a sensor to detect information about the predetermined region used to generate the occupancy grid.

In Example 7, the subject matter of Example 6 can optionally include that the sensor includes at least one of the following sensors: a camera, and/or a radar sensor, and/or a lidar sensor.

In Example 8, the subject matter of any one of Examples 1 to 7 can optionally include that the processor is configured to generate the occupancy grid as a particle filter map.

Example 9 is a vehicle. The vehicle may include an area occupancy determining device. The device may include a memory configured to store at least one occupancy grid of a predetermined region, and a processor configured to generate the occupancy grid of the predetermined region, the occupancy grid including a plurality of grid cells, each grid cell framed by respective grid cell frame lines, and at least some of the grid cells having been assigned an information about the occupancy of the region represented by the respective grid cell, and to dynamically update the occupancy grid, thereby successively generating a plurality of updated occupancy grids. Each updated occupancy grid is moved relative to the previous occupancy grid such that an origin coordinate of the updated occupancy grid is positioned on a contact point of grid cell frame lines of adjacent grid cells. The vehicle may further include a motor configured to drive the vehicle based on the occupancy grids.

Example 10 is an area occupancy determining device. The device may include a memory configured to store at least one occupancy grid of a predetermined region, and a processor configured to generate the occupancy grid of the predetermined region, the occupancy grid including a plurality of grid cells. Each grid cell is defined by respective grid cell lines, and wherein information about the occupancy of the region represented by a respective grid cell is assigned to at least some of the grid cells, and to update the occupancy grid a plurality of times. Each updated occupancy grid is moved relative to the previous occupancy grid by an integer multiple of grid cells so that an origin coordinate of the respectively updated occupancy grid is positioned on a corner of a grid cell of a previous occupancy grid.

In Example 11, the subject matter of Example 10 can optionally include that the grid cells of the occupancy grid have substantially the same size.

In Example 12, the subject matter of any one of Examples 10 or 11 can optionally include that the grid cells of the occupancy grid have a cell size in the range from about 5 cm by 5 cm to about 1 m by 1 m.

In Example 13, the subject matter of any one of Examples 10 to 12 can optionally include that the grid cells of the occupancy grid have substantially the same cell shape.

In Example 14, the subject matter of Example 13 can optionally include that the grid cells of the occupancy grid have substantially a rectangular cell shape.

In Example 15, the subject matter of any one of Examples 10 to 14 can optionally include that the device further includes a sensor to detect information about the predetermined region used to generate the occupancy grid.

In Example 16, the subject matter of Example 15 can optionally include that the sensor includes at least one of the following sensors: a camera, and/or a radar sensor, and/or a lidar sensor.

In Example 17, the subject matter of any one of Examples 10 to 16 can optionally include that the processor is configured to generate the occupancy grid as a particle filter map.

Example 18 is a Vehicle. The vehicle may include an area occupancy determining device. The device may include a memory configured to store at least one occupancy grid of a predetermined region, and a processor configured to generate the occupancy grid of the predetermined region, the occupancy grid including a plurality of grid cells. Each grid cell is defined by respective grid cell lines. Information about the occupancy of the region represented by a respective grid cell is assigned to at least some of the grid cells. The processor may further be configured to update the occupancy grid a plurality of times. Each updated occupancy grid is moved relative to the previous occupancy grid by an integer multiple of grid cells so that an origin coordinate of the respectively updated occupancy grid is positioned on a corner of a grid cell of a previous occupancy grid. The vehicle may further include a motor configured to drive the vehicle based on the occupancy grids.

Example 19 is an area occupancy determining device. The device may include a memory configured to store at least one occupancy grid of a predetermined region, and a processor configured to generate the occupancy grid of the predetermined region, the occupancy grid including a plurality of first grid cells in a first area and a plurality of second grid cells in a second area. The second area is further away from a center of the occupancy grid. The second grid cells are larger than the first grid cells. The processor is further configured to update the occupancy grid, thereby successively generating a plurality of updated occupancy grids.

In Example 20, the subject matter of Examples 19 can optionally include that at least one of the first grid cells or the second grid cells of the occupancy grid have substantially the same size.

In Example 21, the subject matter of any one of Examples 19 or 20 can optionally include that the first grid cells of the occupancy grid have a cell size in the range from about 5 cm by 5 cm to about 1 m by 1 m. The second grid cells of the occupancy grid have a cell size of at least about 1 m by 1 m.

In Example 22, the subject matter of any one of Examples 19 to 21 can optionally include that at least one of the first grid cells or the second grid cells of the occupancy grid have substantially the same cell shape.

In Example 23, the subject matter of any one of Examples 19 to 22 can optionally include that at least some of at least one of the first grid cells or the second grid cells of the occupancy grid have substantially a rectangular cell shape.

In Example 24, the subject matter of any one of Examples 19 to 23 can optionally include that at least some of at least one of the first grid cells or the second grid cells of the occupancy grid have substantially a cell shape of a sector of a circle.

In Example 25, the subject matter of any one of Examples 19 to 24 can optionally include that the device further includes a sensor to detect information about the predetermined region used to generate the occupancy grid.

In Example 26, the subject matter of Example 25 can optionally include that the sensor includes at least one of the following sensors: a camera, and/or a radar sensor, and/or a lidar sensor.

In Example 27, the subject matter of any one of Examples 19 to 26 can optionally include that the processor is configured to generate the occupancy grid as a particle filter map.

Example 28 is a vehicle. The vehicle may include an area occupancy determining device. The device may include a memory configured to store at least one occupancy grid of a predetermined region, and a processor configured to generate the occupancy grid of the predetermined region, the occupancy grid including a plurality of first grid cells in a first area and a plurality of second grid cells in a second area. The second area is further away from a center of the occupancy grid. The second grid cells are larger than the first grid cells. The processor is further configured to update the occupancy grid, thereby successively generating a plurality of updated occupancy grids. The vehicle may further include a motor configured to drive the vehicle based on the occupancy grids.

Example 29 is a method of determining the occupancy of an area. The method may include generating an occupancy grid of a predetermined region, the occupancy grid including a plurality of grid cells, each grid cell framed by respective grid cell frame lines, and at least some of the grid cells having been assigned an information about the occupancy of the region represented by the respective grid cell, and dynamically updating the occupancy grid, thereby successively generating a plurality of updated occupancy grids. Each updated occupancy grid is moved relative to the previous occupancy grid such that an origin coordinate of the updated occupancy grid is positioned on a contact point of grid cell frame lines of adjacent grid cells.

In Example 30, the subject matter of Example 29 can optionally include that the grid cells of the occupancy grid have substantially the same size.

In Example 31, the subject matter of any one of Examples 29 or 30 can optionally include that the grid cells of the occupancy grid have a cell size in the range from about 5 cm by 5 cm to about 1 m by 1 m.

In Example 32, the subject matter of any one of Examples 29 to 31 can optionally include that the grid cells of the occupancy grid have substantially the same cell shape.

In Example 33, the subject matter of Example 32 can optionally include that the grid cells of the occupancy grid have substantially a rectangular cell shape.

In Example 34, the subject matter of any one of Examples 29 to 33 can optionally include that the method further includes detecting, by a sensor, information about the predetermined region used to generate the occupancy grid.

In Example 35, the subject matter of Example 34 can optionally include that the sensor includes at least one of the following sensors: a camera, and/or a radar sensor, and/or a lidar sensor.

In Example 36, the subject matter of any one of Examples 29 to 35 can optionally include that the occupancy grid is generated as a particle filter map.

Example 37 is a method of determining the occupancy of an area. The method may include generating an occupancy grid of a predetermined region, the occupancy grid including a plurality of grid cells. Each grid cell is defined by respective grid cell lines. Information about the occupancy of the region represented by a respective grid cell is assigned to at least some of the grid cells. The method may further include updating the occupancy grid a plurality of times. Each updated occupancy grid is moved relative to the previous occupancy grid by an integer multiple of grid cells so that an origin coordinate of the respectively updated occupancy grid is positioned on a corner of a grid cell of a previous occupancy grid.

In Example 38, the subject matter of Example 37 can optionally include that the grid cells of the occupancy grid have substantially the same size.

In Example 39, the subject matter of any one of Examples 37 or 38 can optionally include that the grid cells of the occupancy grid have a cell size in the range from about 5 cm by 5 cm to about 1 m by 1 m.

In Example 40, the subject matter of any one of Examples 37 to 39 can optionally include that the grid cells of the occupancy grid have substantially the same cell shape.

In Example 41, the subject matter of Example 40 can optionally include that the grid cells of the occupancy grid have substantially a rectangular cell shape.

In Example 42, the subject matter of any one of Examples 37 to 41 can optionally include that the method further incudes detecting, by a sensor, information about the predetermined region used to generate the occupancy grid.

In Example 43, the subject matter of Example 42 can optionally include that the sensor includes at least one of the following sensors: a camera, and/or a radar sensor, and/or a lidar sensor.

In Example 44, the subject matter of any one of Examples 37 to 43 can optionally include that the occupancy grid is generated as a particle filter map.

Example 45 is a method of determining the occupancy of an area. The method may include generating an occupancy grid of a predetermined region, the occupancy grid including a plurality of first grid cells in a first area and a plurality of second grid cells in a second area. The second area is further away from a center of the occupancy grid. The second grid cells are larger than the first grid cells. The method may further include updating the occupancy grid, thereby successively generating a plurality of updated occupancy grids.

In Example 46, the subject matter of Example 45 can optionally include that at least one of the first grid cells or the second grid cells of the occupancy grid have substantially the same size.

In Example 47, the subject matter of any one of Examples 45 or 46 can optionally include that the first grid cells of the occupancy grid have a cell size in the range from about 5 cm by 5 cm to about 1 m by 1 m. The second grid cells of the occupancy grid have a cell size of at least about 1 m by 1 m.

In Example 48, the subject matter of any one of Examples 45 to 47 can optionally include that at least one of the first grid cells or the second grid cells of the occupancy grid have substantially the same cell shape.

In Example 49, the subject matter of any one of Examples 45 to 48 can optionally include that at least some of at least one of the first grid cells or the second grid cells of the occupancy grid have substantially a rectangular cell shape.

In Example 50, the subject matter of any one of Examples 45 to 49 can optionally include that at least some of at least one of the first grid cells or the second grid cells of the occupancy grid have substantially a cell shape of a sector of a circle.

In Example 51, the subject matter of any one of Examples 45 to 50 can optionally include that the method further includes detecting, by a sensor, information about the predetermined region used to generate the occupancy grid.

In Example 52, the subject matter of Example 51 can optionally include that the sensor includes at least one of the following sensors: a camera, and/or a radar sensor, and/or a lidar sensor.

In Example 52, the subject matter of any one of Examples 45 to 51 can optionally include that the occupancy grid is generated as a particle filter map.

While the area occupancy determining device has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. An area occupancy determining device, the device comprising:
   a memory configured to store an occupancy grid of a predetermined region; and
   a processor configured to:
      generate a particle using a sensor measurement;
      generate the occupancy grid of the predetermined region, the occupancy grid comprising a plurality of grid cells, each grid cell framed by respective grid cell frame lines, and a portion of the grid cells having been assigned an information about the occupancy of the region represented by the respective grid cell including an associated belief mass that indicates a likelihood that the particle is in the corresponding grid cell; and
      dynamically update the occupancy grid to successively generate a plurality of updated occupancy grids, wherein each updated occupancy grid is moved relative to a previous occupancy grid such that an occupancy grid center of the updated occupancy grid is positioned on a contact point of grid cell frame lines of adjacent grid cells relative to a previous occupancy grid.

2. The device of claim 1,
   wherein the grid cells of the occupancy grid have the same size.

3. The device of claim 1,
   wherein the grid cells of the occupancy grid have a cell size in the range from 5 cm by 5 cm to 1 m by 1 m.

4. The device of claim 1,
   wherein the grid cells of the occupancy grid have the same cell shape.

5. The device of claim 1, further comprising:
   a sensor to detect information about the predetermined region used to generate the occupancy grid.

6. The device of claim 1, further comprising:
   a motor configured to drive the vehicle based on the occupancy grids;
   wherein the device is configured as a vehicle.

7. An area occupancy determining device, the device comprising:
   a memory configured to store an occupancy grid of a predetermined region; and
   a processor configured to:
      generate a particle using a sensor measurement;
      generate the occupancy grid of the predetermined region, the occupancy grid comprising a plurality of grid cells, wherein each grid cell is defined by respective grid cell lines, and wherein information about the occupancy of the region represented by a respective grid cell is assigned to a portion of the grid cells including an associated belief mass that indicates a likelihood that the particle is in the corresponding grid cell; and update the occupancy grid a plurality of times, wherein each updated occupancy grid is moved relative to a previous occupancy grid by an integer multiple of grid cells such that an occupancy grid center of the respectively updated occupancy grid is positioned on a contact point of grid cell lines relative to a previous occupancy grid.

8. The device of claim 7,
wherein the grid cells of the occupancy grid have the same size.

9. The device of claim 7,
wherein the grid cells of the occupancy grid have a cell size in the range from 5 cm by 5 cm to 1 m by 1 m.

10. The device of claim 7,
wherein the grid cells of the occupancy grid have the same cell shape.

11. The device of claim 7, further comprising:
a sensor to detect information about the predetermined region used to generate the occupancy grid.

12. The device of claim 7,
wherein the processor is configured to generate the occupancy grid as a particle filter map.

13. The device of claim 7, further comprising:
a motor configured to drive the vehicle based on the occupancy grids;
wherein the device is configured as a vehicle.

14. An area occupancy determining device, the device comprising:
a memory configured to store an occupancy grid of a predetermined region; and
a processor configured to:
  generate a particle using a sensor measurement;
  generate the occupancy grid of the predetermined region, the occupancy grid comprising a plurality of first grid cells in a first area and a plurality of second grid cells in a second area each grid cell framed by respective grid cell frame lines, wherein the second area is further away from a center of the occupancy grid, and wherein the second grid cells are larger than the first grid cells, and wherein information about the occupancy of the region represented by a respective grid cell is assigned to a portion of the first grid cells and the second grid cells that includes an associated belief mass that indicates a likelihood that the particle is in the corresponding grid cell; and
update the occupancy grid, thereby successively generating a plurality of updated occupancy grids, wherein the updated occupancy grids are moved relative to previous occupancy grids such that occupancy grid centers of the updated occupancy grids are positioned on contact points of grid cell frame lines of adjacent grid cells relative to a previous occupancy grid.

15. The device of claim 14,
wherein a portion of the first grid cells or the second grid cells of the occupancy grid have the same size.

16. The device of claim 14,
wherein the first grid cells of the occupancy grid have a cell size in the range from 5 cm by 5 cm to 1 m by 1 m; and
wherein the second grid cells of the occupancy grid have a cell size of at least 1 m by 1 m.

17. The device of claim 14,
wherein a portion of the first grid cells or the second grid cells of the occupancy grid have the same cell shape.

18. The device of claim 14,
wherein a portion the first grid cells or the second grid cells of the occupancy grid have a cell shape of a sector of a circle.

19. The device of claim 14, further comprising:
a sensor to detect information about the predetermined region used to generate the occupancy grid.

20. The device of claim 14, further comprising:
a motor configured to drive the vehicle based on the occupancy grids;
wherein the device is configured as a vehicle.

* * * * *